Jan. 20, 1959
C. J. BENSON
2,869,916
RETRACTABLE HOOK MECHANISM
Filed June 30, 1952
3 Sheets-Sheet 3
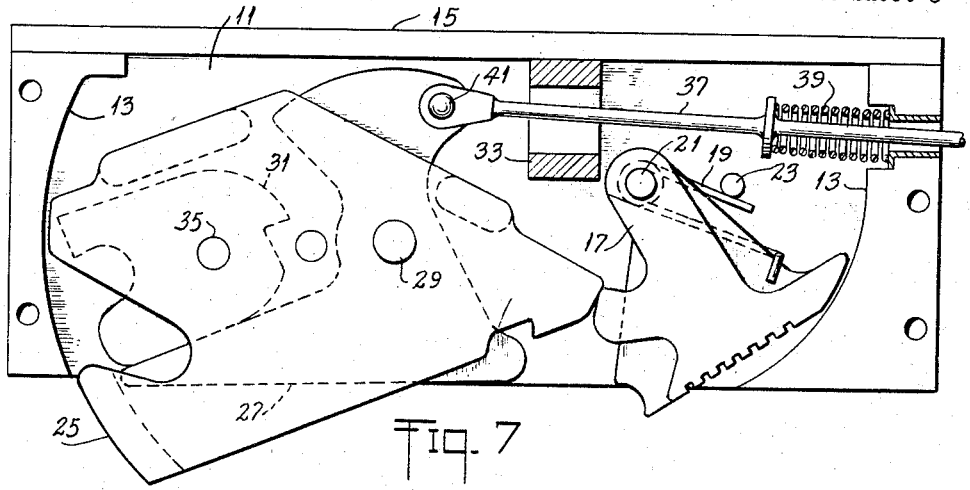
Fig. 7
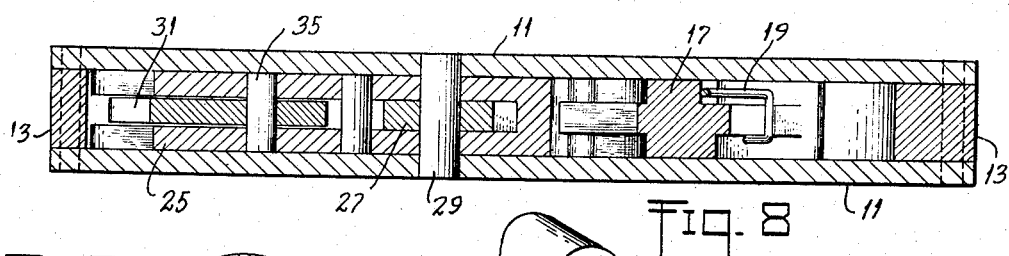
Fig. 8
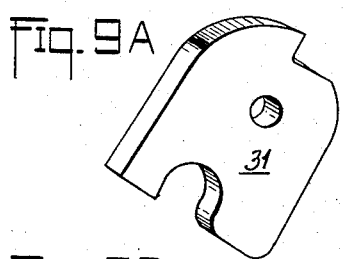
Fig. 9A
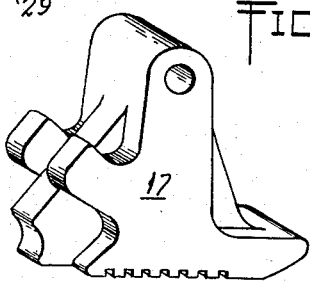
Fig. 9B
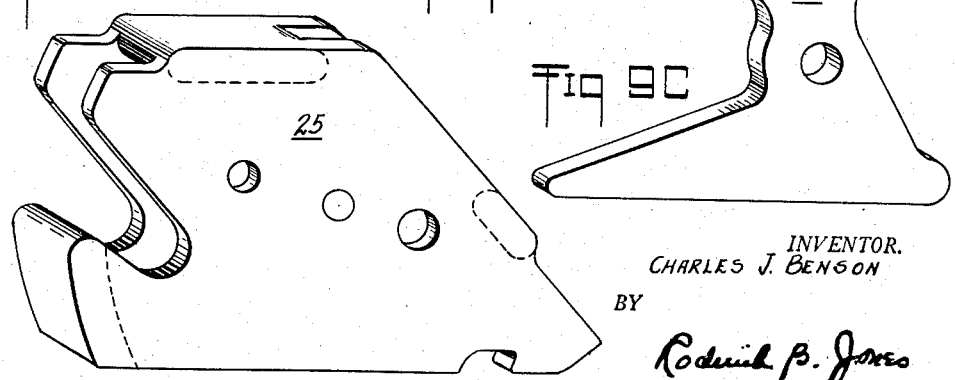
Fig. 9D
Fig. 9C
INVENTOR.
CHARLES J. BENSON
BY
Roderick B. Jones
HIS ATTORNEY

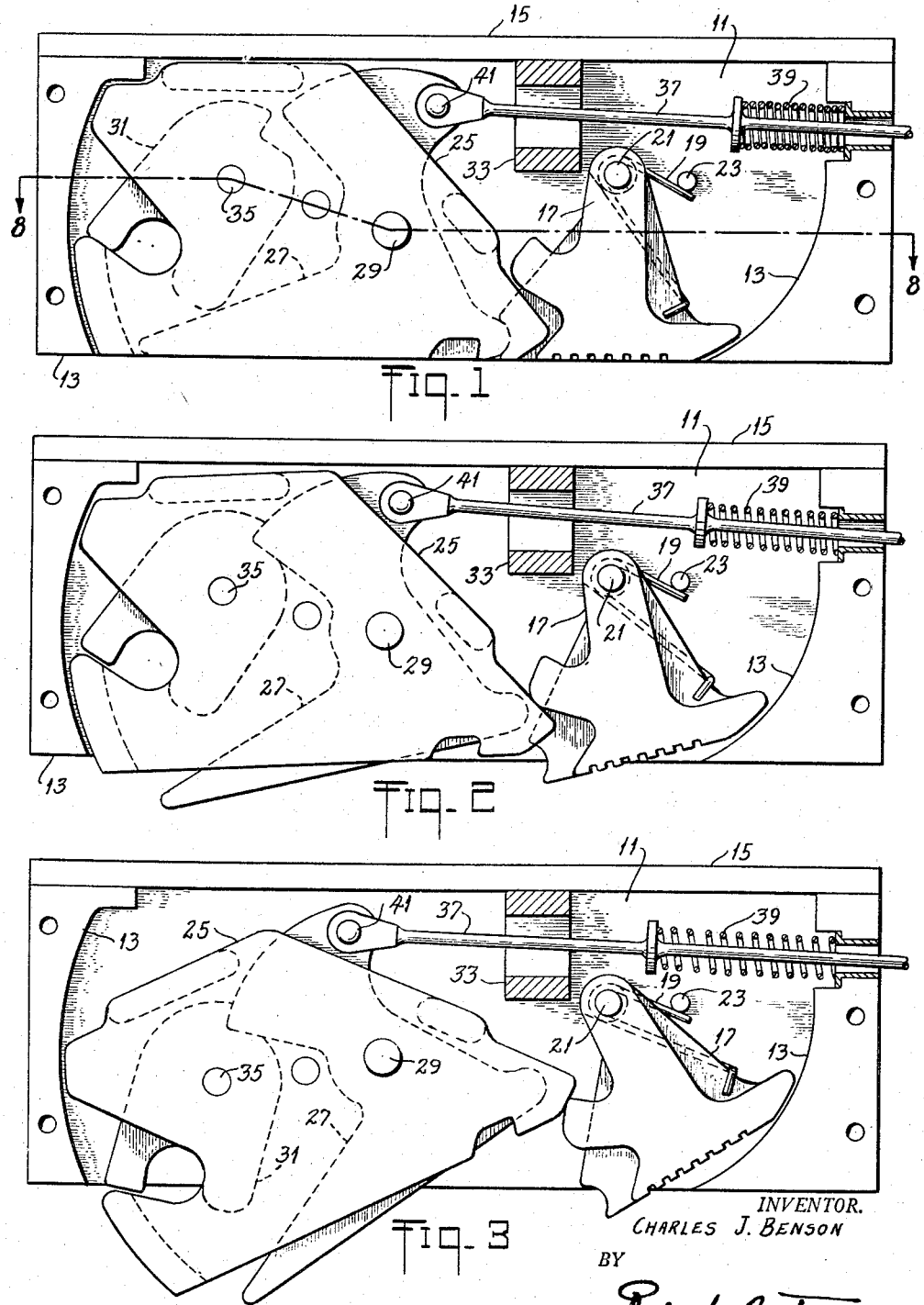

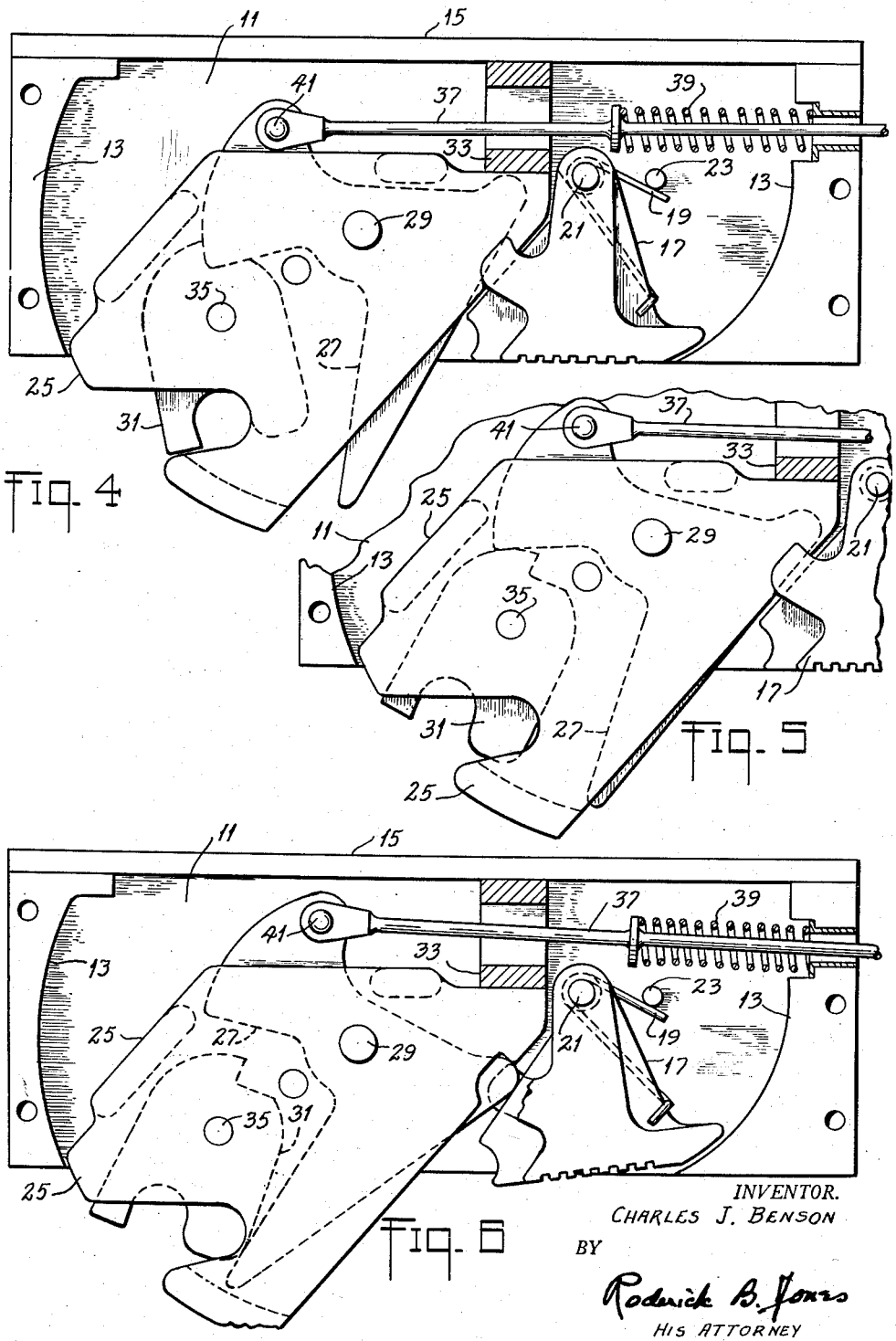

United States Patent Office 2,869,916
Patented Jan. 20, 1959

2,869,916

RETRACTABLE HOOK MECHANISM

Charles J. Benson, Philadelphia, Pa.

Application June 30, 1952, Serial No. 296,512

1 Claim. (Cl. 294—83)

(Granted under Title 35, U. S. Code (1952), sec. 266)

The invention herein described may be manufactured and used by or for the Government of the United States of America for governmental purposes without the payment of any royalties thereon or therefor.

The invention relates to new and useful improvements in an ejecting device and more particularly to a device such that, after an object has been ejected from supporting structure such as an airplane, the attaching mechanism for the ejected object is retracted within the supporting structure so that the external surface of said structure becomes free from projections of any of the attaching members.

The advent of high-speed aircraft demands that nothing interfere with the air flow over the surface of the airplane. Any projection that interferes with the smooth flow of air over the surfaces of an object such as an airfoil passing through the air causes an additional drag thereby reducing the aerodynamic efficiency of the airplane. It is most desirable to maintain this efficiency at as high a level as possible.

With this in mind, the principal object of this invention is to provide a detaching device that retracts within or flush with its supporting surface so that all projecting areas of said device are withdrawn within or flush with their supporting area immediately after the attached object is released and ejected from its fastening included in said device.

Another object of this invention is to provide a detaching device that retracts within or flush with the external contour of the airplane.

Still another object is to provide a device that is small in size and is easily adaptable for installation in any part of the airplane structure.

A further object of this invention is to provide a detaching device that can be unloaded and reloaded without retraction.

These and other objects of the invention and the various features and details of construction and operation thereof are hereinafter more fully set forth and described with reference to the accompanying drawings, in which like numbers refer to like parts.

Fig. 1 is a side-elevational view of the mechanism in the retracted position, one of the side plates being removed.

Fig. 2 is a side-elevational view of the mechanism with the latch partly released from the load-supporting means.

Fig. 3 is a side-elevational view of the mechanism in the half-opened position.

Fig. 4 is a side-elevational view of the mechanism in the open or extended position.

Fig. 5 is a side-elevational view of a portion of the mechanism showing the load-supporting means in extended position with the keeper in open position.

Fig. 6 is a side-elevational view of the mechanism showing the load-supporting means in extended position with the action of the lever against both the keeper and the latch.

Fig. 7 is a side-elevational view of the mechanism showing the camming action between the load-supporting means and the latch.

Fig. 8 is a longitudinal sectional view of the mechanism in the retracted position.

Figs. 9A, 9B, 9C and 9D form an exploded view of the load-supporting means, the lever, the keeper and the latch elements.

The frame or housing for the load-supporting means or hook 25 consists of two side plates 11 separated by two spacers 13 and a top plate 15. Said hook 25 is rotatably mounted on a shaft 29 of said frame and consists of two identical flat-steel plates or other suitable material separated by spacers (see Fig. 9D). An actuation-lever 27, also of flat-steel plate, is rotatably mounted on said shaft between the two plates of said hook (see Fig. 9C). Keeper 31 is rotatably mounted on pin 35 of said hook between the two plates of said hook (see Fig. 9A). A pull rod 37, which is connected to one end of said lever by a pin 41, is pulled when the pilot or operator desires to release the load (not shown). Coaxially mounted on said pull rod is a helical compression spring 39, which is in compression when the hook is in the retracted position.

To place a load on said hook 25, with the device in the retracted position as shown in Figs. 1 and 8, latch 17, which is mounted on a pin 21 of said frame, is rotated in a forward direction or against a leaf-type spring 19. Said spring is mounted on said pin 21 and against pin 23 and said latch. As said latch is rotated from its normally locking position, thereby allowing said hook to rotate, torque is applied to lever 27 through pull rod 37 and pin 41 by spring 39 forcing said hook into extended position. (See Figs. 2 and 3.) A compression block 33 limits the rotation of said hook in extended position. Upon release of said latch, a torque is applied to said latch by said spring 19 returning it to its normal position, thereby positively locking said hook in extended position. (See Fig. 4.)

If the keeper is in the locked position when said hook is in the extended position as shown in Fig. 4, it can be rotated to the unlocked position by pressing lever 27 flush with the forward face of said hook as shown in Fig. 5. This operation unlocks said keeper from said lever and enables said keeper to be rotated on pin 35 to the open or ready position without disengaging said hook from its extended position. When a load is placed into the throat of said hook, said keeper is rotated to the locked position preventing the load from slipping out of said hook until its release is desired.

Release of said load may be accomplished by rotating said lever flush with the forward face of said hook as shown in Fig. 5 in the same manner as opening the keeper from its locked position for loading. However, when positive ejectment of the load is desired while the airplane is in flight, release of the object is accomplished by pulling on said pull-rod in a forward direction. This action rotates lever 27 unlocking and opening keeper 35. At the instant the keeper reaches the limit of its travel, said lever also releases said latch from said hook (see Figs. 6 and 7). Operation of the pull-rod not only disengages latch 17 but, by the same action, the lower tip of said lever bears against said keeper 31 and positively forces the load from said hook.

After the load is released, the lever continues to rotate about pin 29 bearing on the keeper and forces the hook to rotate to its retracted position (see Fig. 7). Top plate 15 limits the rotation of said hook in retracted position. When the hook reaches the limit of its travel to retracted position, leaf-spring 19 urges latch 17 against hook 25 thereby locking said hook in retracted position. Upon release of said pull rod, spring 39 forces the lever 27 in the opposite direction until it comes to bear on the end of latch 17. At this point the mechanism is completely flush with the skin surface of the airplane.

From the foregoing description and illustrations of the present invention it is apparent that a loading and ejecting device of simple design wherein a load can be installed and locked in place quickly and easily, and, when the mechanism is actuated, said load is not only released but ejected positively from its support. After the load has been released, the mechanism retracts the load-supporting member within the supporting frame so that said supporting frame has no projecting area that would offer an undesirable drag for its passage through the supporting medium, and said support is locked in its retracted position until the device is reloaded and ready for another release.

While a particular embodiment of the invention has been shown and described herein, it is not intended that the invention be limited to such disclosure, but that changes and modifications can be made and incorporated within the scope of the claim.

What is claimed:

A retractable releasing device comprising load-supporting means adapted to be mounted on a shaft within a frame and to be rotated into extended and retracted position, keeper means rotatable on said load-supporting means into open and closed positions, lever-actuated means on said frame rotatable coaxially with said load-supporting means, said lever-actuated means being rotatable into one position to lock said keeper closed and into a retracted position retracting said keeper and said load-supporting means, latch means rotatable on said frame and adapted to lock said load-supporting means both in extended and retracted positions, a pull-rod attached to rotate said lever-actuated means, a helical compression spring coaxially mounted on said pull-rod, said spring urging said load-supporting means into extended position on release of said latch means, said lever means being adapted to rotate about said shaft in opposition to said helical compression spring, thereby disengaging said keeper means with said load-supporting means in extended position, a spring, said spring bearing on said latch to prevent rotation, stopping means to limit rotation of said load-supporting means in extended position, stopping means to limit rotation of said load-supporting means in retracted position, whereby an object secured on said load-supporting means is positively ejected in a predetermined direction upon retraction of said load-supporting means.

References Cited in the file of this patent

UNITED STATES PATENTS

| | | |
|---|---|---|
| 997,438 | Clough | July 11, 1911 |
| 1,434,991 | Carey | Nov. 7, 1922 |
| 2,426,221 | Karp et al. | Aug. 26, 1947 |
| 2,502,416 | Brown | Apr. 4, 1950 |
| 2,544,830 | Grill et al. | Mar. 13, 1951 |
| 2,547,313 | Gosser | Apr. 3, 1951 |

FOREIGN PATENTS

| | | |
|---|---|---|
| 197,275 | Canada | Feb. 17, 1920 |